United States Patent [19]
Flotow et al.

[11] Patent Number: 5,251,737
[45] Date of Patent: Oct. 12, 1993

[54] SELF-ADJUSTING MEANS AND METHOD FOR FRICTION CLUTCHES

[75] Inventors: Richard A. Flotow, Butler; Martin E. Kummer, Auburn, both of Ind.

[73] Assignee: Dana Corporation, Toledo, Ohio

[21] Appl. No.: 861,139

[22] Filed: Mar. 31, 1992

[51] Int. Cl.⁵ .............................................. F16D 13/75
[52] U.S. Cl. .............................. 192/111 A; 192/70.25
[58] Field of Search .......................... 192/111 A, 70.25

[56] References Cited

U.S. PATENT DOCUMENTS

| | | | |
|---|---|---|---|
| 3,752,286 | 8/1973 | Sink | 192/111 A |
| 4,099,604 | 7/1978 | Higgerson | 192/111 A |
| 4,445,600 | 5/1984 | Schmidt | 192/111 A X |
| 4,924,991 | 5/1990 | Yakeuchi | 192/111 A |
| 4,941,557 | 7/1990 | Flowtow et al. | 192/111 A X |
| 5,029,687 | 7/1991 | Asada et al. | 192/111 A |
| 5,080,212 | 1/1992 | Flowtow et al. | 192/111 A X |
| 5,090,536 | 2/1992 | Asada | 192/70.25 |

FOREIGN PATENT DOCUMENTS 2210119 1/1989 United Kingdom ........... 192/111 A

Primary Examiner—Rodney H. Bonck
Attorney, Agent, or Firm—John H. Crozier; Robert M. Leonardi

[57] ABSTRACT

A self-adjusting mechanism for a friction clutch of the type having movable pressure plate, adjusting ring, release sleeve, and release lever having ends engaging adjusting ring and release sleeve with intermediate point on release lever engaging pressure plate. Release yoke is engagable with release sleeve to move release sleeve away from pressure plate, release yoke having a selected free play distance between unengaged and engaged positions with respect to release sleeve, free travel distance decreasing as friction surfaces wear. Mechanism includes: sensing mechanism to sense a decrease in free travel distance as engagement occurs and adjusting mechanism responsive to sensing mechanism to cause adjusting ring to advance toward pressure plate as disengagement subsequently occurs, compensating for decrease in free travel distance.

13 Claims, 4 Drawing Sheets

SELF-ADJUSTING MEANS AND METHOD FOR FRICTION CLUTCHES

BACKGROUND OF THE INVENTION

1. Field of the Invention

The present invention relates generally to spring-loaded friction clutches and, in particular, to an improved self-adjusting device and method for automatically compensating for wear in the friction surfaces of such clutches.

2. Background Art

Automatic adjusting devices are well known in the art and are typically interposed in the lever system of a friction clutch so as to be operable to compensate for the wear of the friction surfaces therein. While a number of such devices operate in a satisfactory manner to compensate for wear, they frequently require numerous parts and, therefore, are relatively expensive to manufacture, assemble, and service. A further disadvantage of such conventional adjusting devices is that they incorporate a certain amount of free play therein, so that they are operable to adjust the spacing of the friction surfaces of the clutch mechanism only when the clutch is stroked through a certain degree. If this degree of stroking is high, the operator of the clutch may well not stroke the clutch sufficiently for operation of the adjuster for fear of reaching the shaft lock-up position of the clutch pedal.

SUMMARY OF THE INVENTION

The present invention overcomes the disadvantages of convention self-adjusting clutch mechanisms by providing, in a preferred embodiment, a self-adjusting mechanism for a friction clutch, said friction clutch having a cover, a pressure plate moveable relative to said cover to cause friction surfaces of said clutch to engage, an adjusting ring normally stationary with respect to said pressure plate, but adjustably moveable toward said pressure plate, a release sleeve movable toward and away from said pressure plate, and a release lever having its ends engaging said adjusting ring and said release sleeve with an intermediate point on said release lever engaging said pressure plate, such that movement of said release sleeve toward said pressure plate will cause said release lever to apply pressure to said pressure plate to cause said pressure plate to move to cause said engagement of said friction surfaces and movement of said release sleeve away from said pressure plate will, in opposite manner, cause disengagement of said friction surfaces, a release yoke engagable with said release sleeve to move said release sleeve away from said pressure plate, said release yoke having a selected free play distance between unengaged and engaged positions with respect to said release sleeve, and said free travel distance decreases as said friction surfaces wear, said mechanism comprising: sensing means to sense a decrease in said free travel distance as said engagement occurs; and adjusting means responsive to said sensing means to cause said adjusting ring to advance toward said pressure plate as said disengagement subsequently occurs, to compensate for said decrease in said free travel distance.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Figure 1:
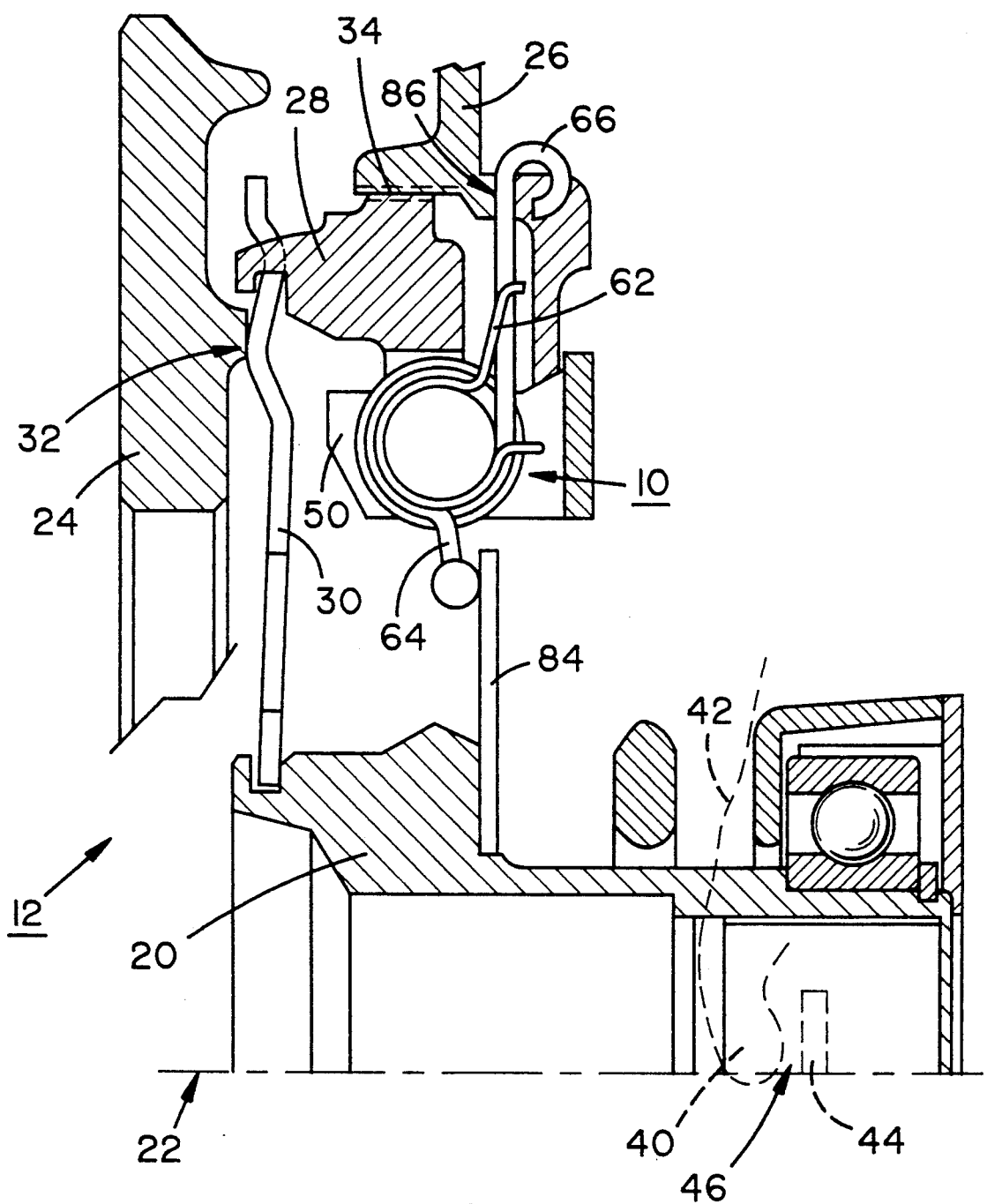
FIG. 1 is a fragmentary, side elevational view, partially in cross-section, of a friction clutch including the self-adjusting mechanism of the present invention.
Figure 2:
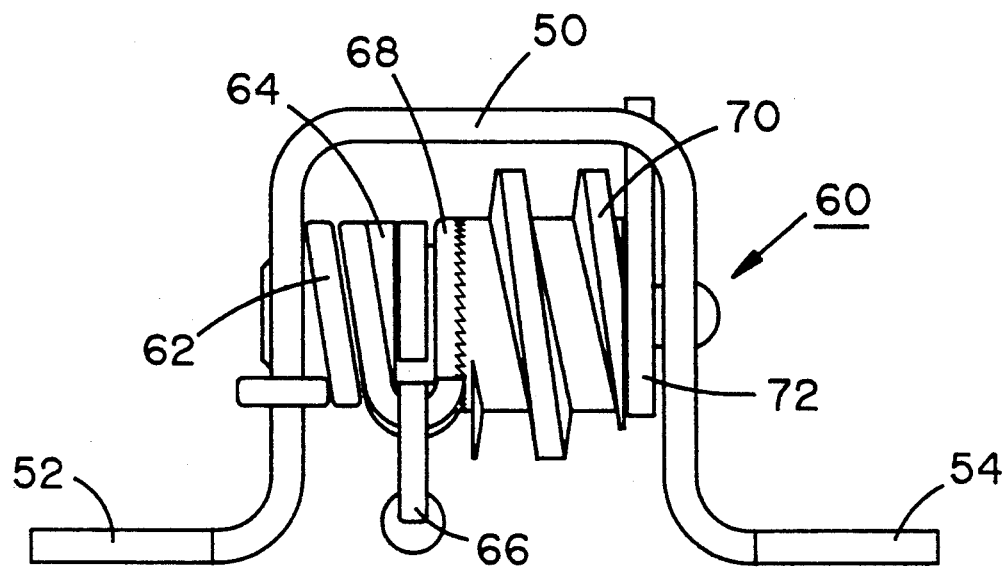
FIGS. 2 and 3 are top plan and side elevational views, respectively, of the assembled self-adjusting mechanism of FIG. 1.
Figure 3:
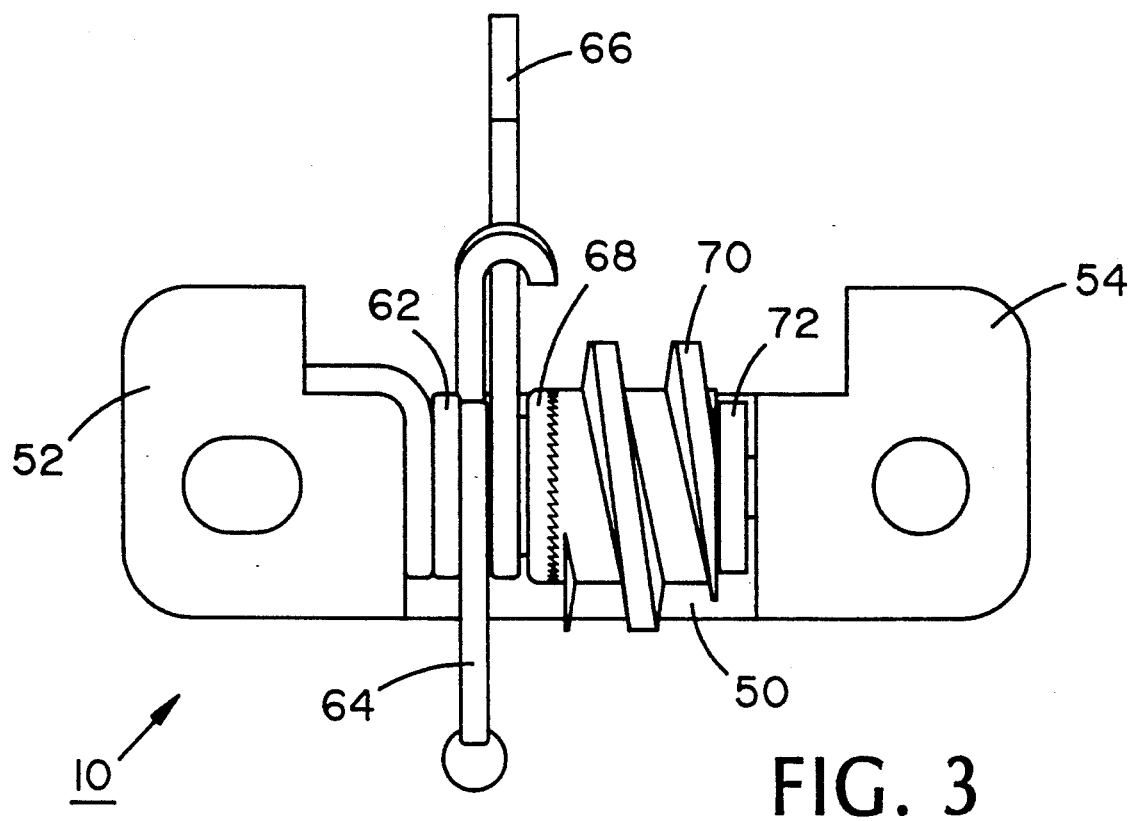
Figure 4:
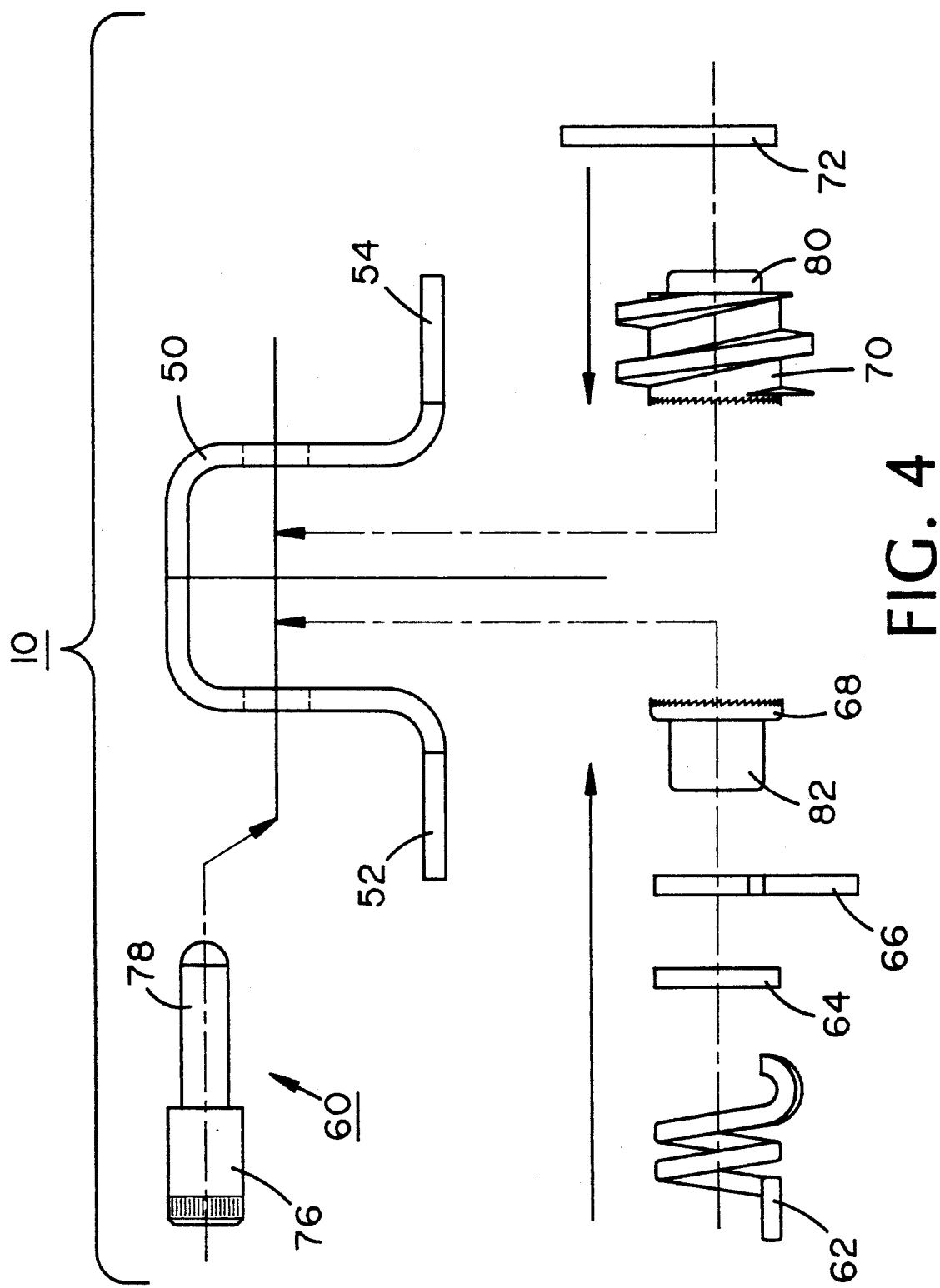
FIG. 4 is an exploded top plan view of the self-adjusting adjusting mechanism of FIGS. 1-3.
Figure 5:
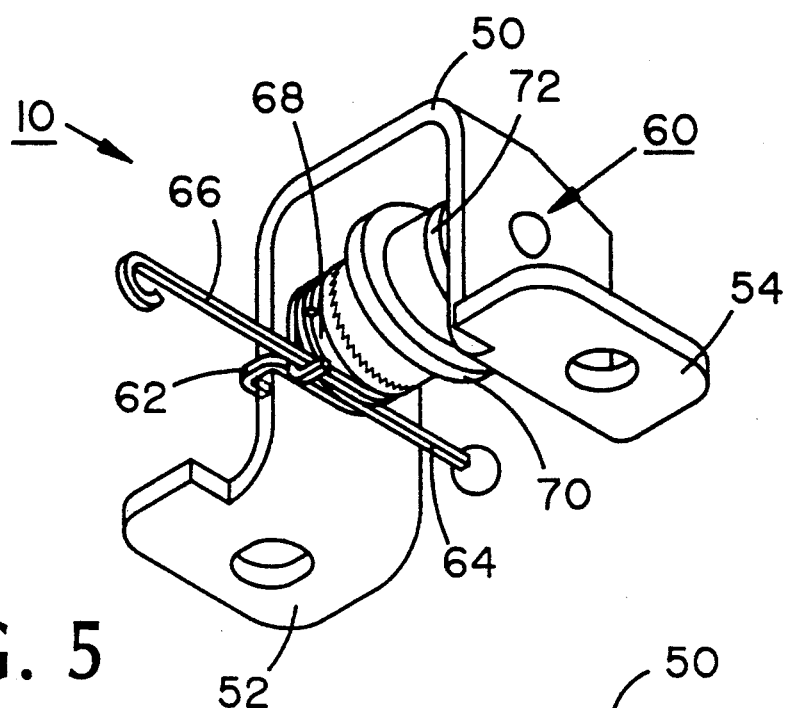
FIG. 5 is a perspective view of the assembled self-adjusting adjusting mechanism of FIGS. 1-4.
Figure 6:
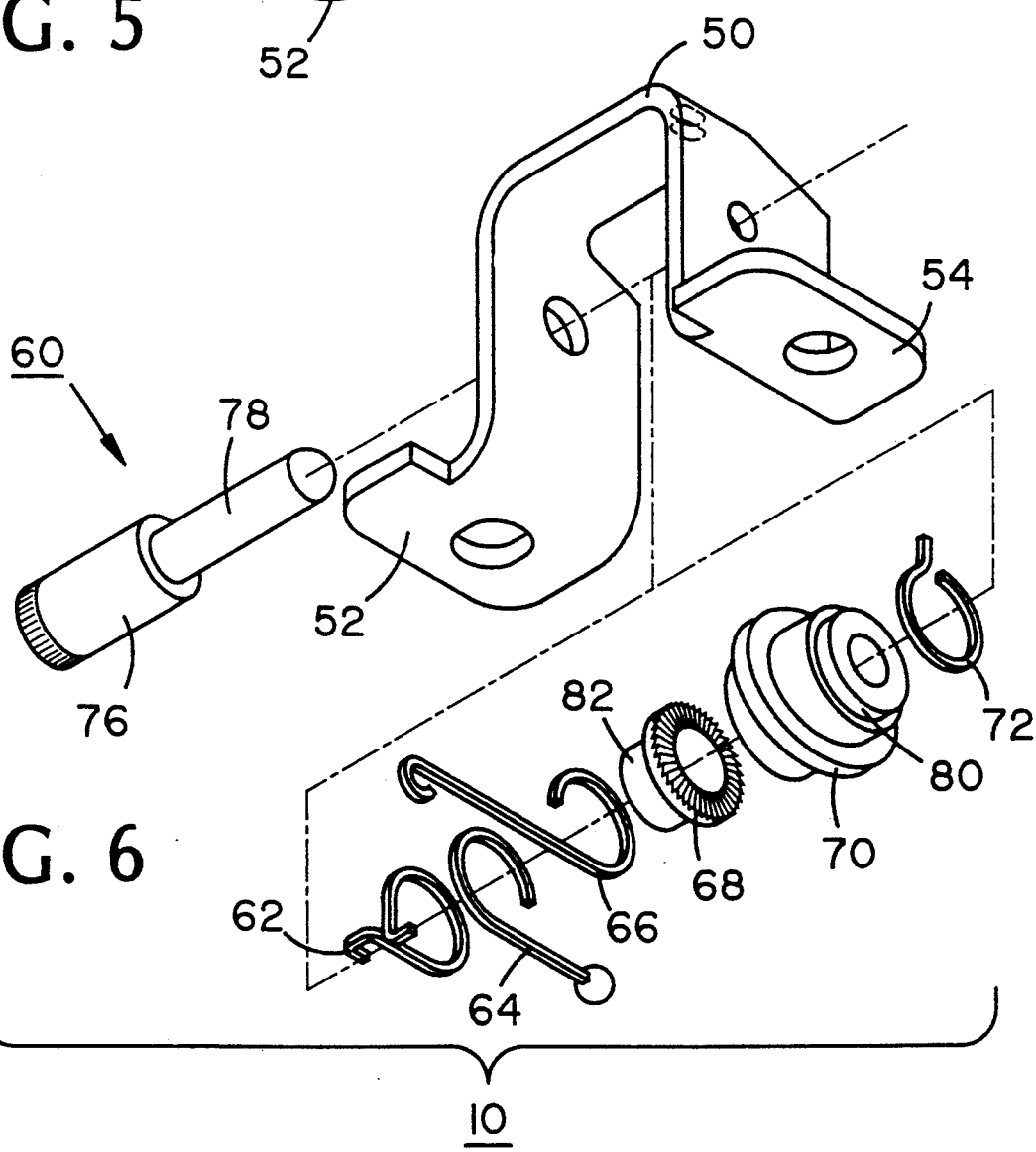
FIG. 6 is an exploded perspective view of the self-adjusting mechanism of FIGS. 1-5.

Reference should now be made to the drawing figures, in which similar or identical elements are given consistent identifying numerals throughout the various figures thereof, and in which parenthetical references direct the reader to the Figure(s) on which the element(s) being described may be best seen, although the element(s) may be seen also on other figures.

FIG. 1 depicts a self-adjusting clutch mechanism according to the present invention, generally indicated by the reference numeral 10, shown installed as part of a friction clutch, generally indicated by the reference numeral 12. Clutch 12 includes a release sleeve 20 which can be slidably mounted on a shaft (not shown) the centerline of which shaft is indicated at 22. Clutch 12 further includes a pressure plate 24, a cover 26, an adjusting ring 28, and a release lever 30. The ends of release lever 30 loosely engage retainer sleeve 20 and adjusting ring 28 at the places indicated and, intermediate the ends thereof, the release lever engages pressure plate 24 at a fulcrum point 32. Adjusting ring 28 rotatably engages cover 26 at a gear thread 34.

As shown on FIG. 1, clutch 12 is in the engaged position (by means of a conventional spring mechanism—not shown), with release lever 30 bearing against pressure plate 24 causing the engagement of friction surfaces (not shown). When it is desired to disengage clutch 12, the distal end 40 of a clutch release yoke 42 is moved to the right on FIG. 1, through a free travel distance 46, to engage a wear plate 44 attached to release sleeve 20 to draw the release sleeve to the right. This action releases the pressure of release lever 30 on pressure plate 24 which permits the pressure plate to move to the right on FIG. 1 and disengage the friction surfaces.

The elements and operation described so far for clutch 12 are conventional. It will be understood that, as the friction surfaces (not shown) of clutch 12 wear, pressure plate 24 will move to the left on FIG. 1. This causes release sleeve to move further to the left on FIG. 1 to engage clutch 12. Consequently, unless adjustment were made for such wear, free travel distance 46 would decrease until wear plate 44 distal end 40 of release yoke 40, resulting in slippage of clutch 12. To compensate for this wear and to prevent such slippage, adjusting ring 28 is conventionally rotated by manual or automatic means to advance the adjusting ring closer to pressure plate 24 and maintain the desired free travel distance 46.

Reference also now to FIGS. 2-6 will aid in understanding the construction and operation of self-adjusting mechanism 10. Mechanism 10 includes a U-shaped bracket 50 having mounting flanges 52 and 54 extending outwardly therefrom for the mounting thereof to cover 26. Fixedly disposed between opposing walls of U-shaped bracket 50 is a shaft, generally indicated by the reference numeral 60 (FIGS. 4 and 6), and mounted about the shaft between the opposing walls, in the following order, are: a torsion spring 62, a sensing arm 64, an adjusting arm 66, a hub 68, a worm gear 70, and a holding spring 72. The facing surfaces of hub 68 and worm gear 70 have complementarily mating ratchetting surfaces such that the hub may be relatively rotated with respect to the worm gear, but will rotatingly drive the worm gear when the hub is rotated in the other direction. Hub 68 is rotatably mounted on a large diameter portion 76 (FIGS. 4 and 6) of shaft 60 and worm gear 70 is mounted on a small diameter portion 78 (FIGS. 4 and 6) of the shaft. Holding spring 72 engages a cylindrical surface 80 (FIGS. 4 and 6) of worm gear 70, while torsion spring 62, sensing arm 64, and adjusting arm 66 engage a cylindrical surface 82 (FIGS. 4 and 6) of hub 68. Torsion spring biases together the mating ratchetting surfaces of hub 68 and worm gear 70.

For purposes of the following description of the relative motions of the elements of the invention and for purposes of the appended claims, "clockwise" and "counterclockwise" shall refer to the elements as the positions thereof are indicated on FIG. 1.

Referring to FIG. 1, it can be seen that the distal end of sensing arm 64 is disposed such that engagement thereof, and movement to the left, by a plate 84 fixedly mounted to release sleeve 20 will cause the sensing arm to rotate clockwise. It can further be seen that counterclockwise rotation of adjusting arm 66 is limited by engagement of the distal end thereof with a shoulder 86 formed on cover 26.

Referring now also to FIGS. 2–6, torsion spring 62 is disposed so as to provide counterclockwise force on adjusting arm 66. The looped proximal ends of sensing arm 64 and adjusting arm 66 engage cylindrical surface 82 to provide unidirectional clutch action such that clockwise motion of the sensing arm will cause the looped end thereof to tighten about the cylindrical surface so as to cause hub 68 to rotate clockwise. In like manner, clockwise rotation of hub 68 will cause the looped end of adjusting arm 66 to tighten, thus causing the adjusting arm to rotate clockwise.

The ratchetting surfaces of hub 68 and worm gear 70 are arranged so that the hub can rotate clockwise relative to the worm gear, but counterclockwise rotation of hub 68 will cause the worm gear to rotate counterclockwise with the hub. Unidirectional clutch action of the looped end of holding spring 72 on surface 80 of worm gear 70 prevents the worm gear from rotating clockwise, but allows counterclockwise rotation thereof. Counterclockwise rotation of worm gear 70 causes adjusting ring 28 (FIG. 1) to rotate in cover 26 and thereby advance toward pressure plate 24.

For set up, with the clutch engaged, but without rotation thereof, adjusting arm 66 is manually rotated counterclockwise against shoulder 86 of cover 26 (FIG. 1). Due to the unidirectional clutch action of the looped portions of sensing arm 64 and adjusting arm 66 on surface 82 of hub 68, such movement of the adjusting arm causes the sensing arm to rotate counterclockwise so that the distal end thereof engages plate 84 (FIG. 1), while hub 68 rotates counterclockwise relative to worm gear 70. Clutch 12 is adjusted to obtain the desired free travel distance 46.

As long as there is no wear in the friction surfaces of clutch 12, plate 84 will move between a position spaced from the distal end of sensing arm 64 by the amount of the free travel distance, when the clutch is disengaged, to a position just touching the distal end, when the clutch is engaged as shown on FIG. 1.

When any wear of the friction surfaces of clutch 12 occurs, causing pressure plate 24 to move to the left on FIG. 1, the distal end of sensing arm 64 will be moved to the left by plate 84 by an amount representative of the degree of wear as the clutch is engaged. This movement causes sensing arm 64 to rotate clockwise, causing hub 68 to rotate clockwise and index one or more ratchet teeth relative to worm gear 70. At the same time, clockwise rotation of hub 68 causes adjusting arm 66 to rotate clockwise, thus loading torsion spring 62. As long as clutch 12 remains engaged, the foregoing elements will be held in the positions described by virtue of the pressure of plate 84 against the distal end of sensing arm 64.

As soon as clutch 12 begins to become disengaged, plate 84 begins to move to the right on FIG. 1, releasing the pressure of the plate on the distal end of sensing arm 64, and thus permitting loaded torsion spring 62 to rotate adjusting arm 66 counterclockwise and, by virtue of the unidirectional clutch action of later on surface 82, causing hub 68 to rotate counterclockwise and to drive engaged worm gear 70 in counterclockwise movement. The latter movement causes adjusting ring 28 to rotate in cover 26 to increment toward pressure plate 24. As the distal end of adjusting arm 66 is moved against shoulder 86, the distal end of sensing arm 64 is simultaneously moved back into position spaced apart from plate 84 by an amount representative of the free travel distance 46.

Further wear of friction surfaces of clutch 12 will result in repetition of the above sequence and further incrementing of adjusting ring 28 toward pressure plate 24.

Thus, mechanism 10 senses reduction in free travel distance when clutch 12 is engaged and immediately sets itself so that self-adjustment action occurs immediately upon unloading of the clutch.

Since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A self-adjusting mechanism for a friction clutch, said friction clutch having a cover, a pressure plate moveable relative to said cover to cause friction surfaces of said clutch to engage, and adjusting ring adjustably moveable toward said pressure plate, a release sleeve movable toward and away from said pressure plate, and a release lever having its ends engaging said adjusting ring and said release sleeve with an intermediate point on said release lever engaging said pressure plate, such that movement of said release sleeve toward said pressure plate will cause said release lever to apply pressure to said pressure plate to cause said pressure plate to move to cause said engagement of said friction surfaces and movement of said release sleeve away from said pressure plate will, in opposite manner, cause disengagement of said friction surfaces, a release yoke engagable with said release sleeve to move said release sleeve away from said pressure plate, said release yoke having a selected free play distance between unengaged and engaged positions with respect to said release sleeve, said free travel distance decreasing as said friction surfaces wear, said mechanism comprising:

(a) sensing means to sense a decrease in said free travel distance as said engagement occurs; and (b) adjusting means responsive to said sensing means to cause said adjusting ring to advance toward said pressure plate as said disengagement subsequently occurs, to compensate for said decrease in said free travel distance.

2. A mechanism, as defined in claim 1, wherein said sensing means is moved from an initial position to a displaced position representative of said decrease in said free travel distance as said engagement occurs.

3. A mechanism, as defined in claim 2, wherein said displacement of said sensing means loads a spring mechanism, the unloading of which spring mechanism causes said advancement of said adjusting ring when said subsequent disengagement occurs.

4. A mechanism, as defined in claim 3, further including return means to cause said sensing means to return to said initial position when said subsequent disengagement occurs.

5. A mechanism, as defined in claim 1, wherein, said adjusting means comprises:

(a) a hub rotatably mounted on a shaft and having a first cylindrical surface, said shaft being fixedly disposed with respect to said pressure plate;

(b) a worm gear rotatably mounted on said shaft and having a second cylindrical surface, said worm gear being engaged with a gear thread formed on said adjusting ring such that rotation of said worm gear in a counterclockwise direction, relative to a datum, will cause said adjusting ring to advance toward said pressure plate;

(c) said hub and said worm gear having formed thereon complementarily mating ratchetting surfaces such that said hub can rotate in a clockwise direction relative to said worm gear, but can engage and drive said worm gear in a counterclockwise direction when said hub rotates counterclockwise; and (d) a first spring mechanism operatively connected to said first surface with a first unidirectional clutch such that unloading of said first spring mechanism will cause said hub to rotate in a counterclockwise direction and rotation of said hub in a clockwise direction will load said first spring;

and said sensing means comprises:

(e) a sensing arm, the distal end of which is engagable by a portion of said release sleeve for movement thereby from said initial position to said displaced position, said movement causing clockwise rotation of said sensing arm; and (f) said sensing arm having its proximal end operatively connected to said first surface with a second unidirectional clutch such that said clockwise rotation of said sensing arm will cause said hub to rotate in said clockwise direction and thereby load said first spring.

6. A mechanism, as defined in claim 5, wherein said first spring mechanism includes:

(a) an adjusting arm having its proximal end operatively connected to said first surface with said first unidirectional clutch such that clockwise rotation of said hub will cause said adjusting arm to rotate clockwise; and (b) a torsion spring connected to said adjusting arm such that said torsion spring will load when said adjusting arm rotates clockwise and will unload when said first unidirectional clutch permits said adjusting arm to rotate counterclockwise.

7. A mechanism, as defined in claim 6, further comprising means stationary with respect to said cover to engage the distal end of said adjusting arm and limit the degree of counterclockwise rotation thereof.

8. A mechanism, as defined in claim 5, further comprising second spring means to operatively engage said second surface with a third unidirectional clutch such as to prevent rotation of said worm gear clockwise.

9. A mechanism, as defined in claim 5, wherein said first spring means further biases together said mating ratchetting surfaces.

10. A method of adjusting a friction clutch, said friction clutch having a cover, a pressure plate movable relative to said cover to cause friction surfaces of said clutch to engage, an adjusting ring adjustably moveable toward said pressure plate, a release sleeve movable toward and away from said pressure plate, and a release lever having its ends engaging said adjusting ring and said release sleeve with an intermediate point on said release lever engaging said pressure plate, such that movement of said release sleeve toward said pressure plate will cause said release lever to apply pressure to said pressure plate to cause said pressure plate to move to cause said engagement of said friction surfaces and movement of said release sleeve away from said pressure plate will, in opposite manner, cause disengagement of said friction surfaces, a release yoke engagable with said release sleeve to move said release sleeve away from said pressure plate, said release yoke having a selected free play distance between unengaged and engaged positions with respect to said release sleeve, said free travel distance decreasing as said friction surfaces wear, said method comprising:

(a) sensing a decrease in said free travel distance as said engagement occurs; and (b) in response to said sensing a decrease in said free travel distance, automatically causing said adjusting ring to advance toward said pressure plate as said disengagement subsequently occurs, to compensate for said decrease in free travel distance.

11. A method, as defined in claim 10, further comprising moving said sensing means from an initial position to a displaced position representative of said decrease in said free travel distance as said engagement occurs.

12. A method, as defined in claim 11, wherein said displacement of said sensing mechanism loads a spring mechanism, the unloading of which spring mechanism causes said advancement of said adjusting ring when said subsequent disengagement occurs.

13. A method, as defined in claim 12, further comprising causing said sensing means to return to said initial position when said subsequent disengagement occurs.

* * * * *